(12) United States Patent
Ginster et al.

(10) Patent No.: US 11,247,185 B2
(45) Date of Patent: Feb. 15, 2022

(54) DEVICE FOR THE SUCCESSIVE INTRODUCTION OF ADDITIVES INTO A POLYMER GRANULATE AND USE OF THE DEVICE

(71) Applicant: KÖLLEMANN GMBH, Adenau (DE)

(72) Inventors: Matthias Ginster, Reiffscheid (DE); Guido Fiedler, Welschenbach (DE)

(*) Notice: Subject to any disclaimer, the term of this patent is extended or adjusted under 35 U.S.C. 154(b) by 0 days.

(21) Appl. No.: 16/500,884

(22) PCT Filed: Jan. 30, 2019

(86) PCT No.: PCT/EP2019/052214
§ 371 (c)(1),
(2) Date: Oct. 4, 2019

(87) PCT Pub. No.: WO2019/149739
PCT Pub. Date: Aug. 8, 2019

(65) Prior Publication Data
US 2020/0385533 A1    Dec. 10, 2020

(30) Foreign Application Priority Data
Feb. 5, 2018  (EP) .................................... 18155132

(51) Int. Cl.
*B01F 7/08*   (2006.01)
*B01F 3/18*   (2006.01)
(Continued)

(52) U.S. Cl.
CPC .............. *B01F 7/085* (2013.01); *B01F 3/184* (2013.01); *B01F 7/0065* (2013.01); *B01F 7/08* (2013.01);
(Continued)

(58) Field of Classification Search
CPC .. B01F 7/085; B01F 7/08; B01F 3/184; B01F 7/0065; B01F 15/00935; B01F 15/00993;
(Continued)

(56) References Cited

U.S. PATENT DOCUMENTS 3,219,320 A * 11/1965 Sutter ..................... B29B 7/429
                                                              366/289
3,346,242 A * 10/1967 List ......................... B29B 7/421
                                                               366/81
(Continued)

FOREIGN PATENT DOCUMENTS

EP           1203650 A1     5/2002

OTHER PUBLICATIONS

International Search Report and Written Opinion Form PCT/ISA/220 and PCT/ISA/237, International Application No. PCT/EP2019/052212, pp. 1-10, International Filing Date Jan. 30, 2019, dated Jun. 4, 2019.

*Primary Examiner* — Tony G Soohoo
(74) *Attorney, Agent, or Firm* — Troutman Pepper Hamilton Sanders LLP (57) ABSTRACT

The invention focuses on a device for sequentially introducing additives in a polymer granulate and the use of the device for mixing the polymer granulate with the additives. The device consisting of a mixer with housing, comprising at least one mixer shaft attached in helix arranged non-continuous conveying pattern shapes, being rotated by a drive for the transport, whereby the mixer in the housing featuring an inlet for the polymer granulate to be mixed and each of the several subsequent inlets for the additive is followed by an outlet for the polymer granulate mixed with the additive, so that two or several mixing zones being formed in the mixer and whereby at least between at two mixing zones on the surface of the mixing shaft one section featuring a continuous screw conveyor instead of the non- (Continued)

continuous conveying pattern shapes, the section not being penetrable for returning solids from the subsequent mixing zone.

15 Claims, 7 Drawing Sheets

(51) Int. Cl.
| | |
|---|---|
| *B01F 7/00* | (2006.01) |
| *B01F 15/00* | (2006.01) |
| *B29B 7/42* | (2006.01) |
| *B29B 7/48* | (2006.01) |
| *B29B 7/90* | (2006.01) |
| *B01F 15/02* | (2006.01) |
| *C08J 3/00* | (2006.01) |
| *C08J 3/20* | (2006.01) |
| *B29B 7/60* | (2006.01) |

(52) U.S. Cl.
CPC .. *B01F 15/00935* (2013.01); *B01F 15/00993* (2013.01); *B29B 7/421* (2013.01); *B29B 7/482* (2013.01); *B29B 7/90* (2013.01); *B01F 7/00425* (2013.01); *B01F 2015/0221* (2013.01); *B29B 7/60* (2013.01); *C08J 3/005* (2013.01); *C08J 3/203* (2013.01)

(58) Field of Classification Search
CPC .......... B01F 7/00425; B01F 2015/0221; C08J 3/005; C08J 3/203; B29B 7/421; B29B 7/482; B29B 7/60; B29B 7/90
See application file for complete search history.

(56) References Cited

U.S. PATENT DOCUMENTS

| | | | | |
|---|---|---|---|---|
| 3,548,926 | A * | 12/1970 | Archer | B65G 33/00 165/87 |
| 3,595,533 | A * | 7/1971 | Sutter | B29C 48/56 366/75 |
| 3,601,370 | A * | 8/1971 | Ruettener | B29C 48/395 366/289 |
| 3,632,256 | A | 1/1972 | Kasting et al. | |
| 3,652,064 | A * | 3/1972 | Lehnen | B29C 48/64 366/88 |
| 3,669,416 | A * | 6/1972 | Sutter | B01F 7/08 366/145 |
| 3,672,641 | A * | 6/1972 | Slaby | B29C 48/761 425/73 |
| 3,814,563 | A * | 6/1974 | Slaby | B29C 48/92 425/203 |
| 3,873,072 | A * | 3/1975 | Blackmon | B29C 48/687 366/80 |
| 4,304,054 | A * | 12/1981 | Nauck | F26B 5/14 34/183 |
| 4,416,606 | A * | 11/1983 | Sugano | B01J 2/20 425/202 |
| 5,816,698 | A * | 10/1998 | Durina | B29B 7/429 366/81 |
| 6,183,560 | B1 * | 2/2001 | Sarrasin | B01F 7/0065 118/417 |
| 6,547,431 | B1 * | 4/2003 | Womer | B29C 48/505 366/81 |
| 2020/0385533 | A1 * | 12/2020 | Ginster | B01F 3/184 |

* cited by examiner

DEVICE FOR THE SUCCESSIVE INTRODUCTION OF ADDITIVES INTO A POLYMER GRANULATE AND USE OF THE DEVICE

CROSS-REFERENCES TO RELATED APPLICATIONS

This application is a national stage application under 35 U.S.C. 371 based on international patent application PCT/EP2019/052214 filed on Jan. 30, 2019, which claims priority to European Patent Application No. 18155132.6 filed on Feb. 5, 2018 disclosures of both of which are incorporated herein by reference in their entireties.

BACKGROUND OF THE INVENTION

The invention focuses on a device for sequentially introducing additives in a polymer granulate and the use of the device for mixing the polymer granulate with the additives. The device consisting of a mixer with housing, comprising at least one mixer shaft attached in helically arranged non-continuous conveying pattern shapes, being rotated by a drive for transporting the polymer granulate, whereby the mixer in the housing featuring an inlet for the polymer granulate to be mixed and each of the several subsequent inlets for the additive is followed by an outlet for the polymer granulate mixed with the additive, so that two or several mixing zones being formed in the mixer and whereby at least between two mixing zones on the surface of the mixing shaft one section featuring a continuous screw conveyor instead of the non-continuous conveying pattern shapes, the section not being penetrable for returning solids from the subsequent mixing zone. The invention also focuses on the application of the device.

In the production of polymers, thermoplastic compounds often need to be mixed up with additives. Examples for thermoplastic compounds are polymer granulates. The mixing of the additives with the thermoplastic compounds is usually carried out in mixers, the mixers consisting of a housing with one or several mixing screws. The mixer screw is formed by a rotatable mixer shaft, featuring several screw conveyors on its surface, the screw conveyors being mounted on the mixer shaft in a helical arrangement. Because of the rotation, the polymer granulate is then transported within the housing. The housing includes an inlet at one end for the polymer granulate, whereby the polymer granulate is filled into the mixer, one inlet for the additive and one outlet for the additive mixed with the polymer granulate. The mixing shaft together with the screw conveyors is then rotated, whereby the polymer granulate and the additive are being moved within the housing, consequently mixing them up.

Because of the mixing with additives, it is often necessary to provide a polymer granulate for different purposes. Different additives are being employed for those purposes in order to produce the polymer granulate for different applications. In some cases it might be necessary that additives need to be replaced for the production of polymer granulates. Contamination of the produced polymer granulate which is provided with an additive with another additive is not desirable in this context. Cleaning the mixer is very complicated and requires careful execution. Consequently, the option of cleaning the mixer when changing the additive is unsuitable due to economic reasons.

Soot is one of the additives very often used as an additive for polymer granulates. It is being used for blackening thermoplastic masses. Adding soot into the mixer for mixing, a conventional mixer can be exclusively used for the mixing of soot without further cleaning or measurements. This is economically disadvantageous; so that options are sought to mix polymer granulates with other additives without being contaminated with soot.

For this reason, the state of art provides mixers featuring several mixing zones. Those mixing zones being formed by one inlet and one outlet in the housing, so that one mixing zone being defined by the area between the inlet of the mixer for one additive and the outlet of the mixer for the polymer granulate mixed with the additive. Because of the succession of inlets and outlets, several mixing zones are being defined, namely in the direction of transport of the transported goods, thus the polymer granulate. The additive which is not desired to become contaminated is placed into the last mixing zone. Soot e.g. is placed into the last mixing zone in the direction of transport. The pure polymer granulate is generally added into a separate inlet at the beginning of the mixer in the direction of transport, consequently achieving an improved mixture with the additive.

Document U.S. Pat. No. 3,632,256A describes an extruder or mixer for mixing plastics with additives, whereby the extruder or mixer featuring several extruder shafts in an extruder housing, containing several inlets for the additives and several outlets for the outlet of the mixed plastic material, so that several of separated mixing zones being formed along the length of the extruder housing, whereby the mixer features helical means, the helical means feature rotational direction change between the mixing zones and whereby the extruder shafts are parallel, opposite or into one another interwoven.

Document U.S. Pat. No. 4,443,109A describes a device and a method for automatically and continuously feeding and automatically and continuously mixing and cutting particulate material, whereby the particulate material is first placed without mixing via a feed pipe into a mixing chamber by means of gravity, resulting in a certain material height, different additives being added via rotatable, helical means of transport, leading to an equilibrium of the mixture within the chamber and whereby the additives being added within the mixing chamber above the material height, the different added additives mixing up with the particulate material in the mixing chamber, thereby determine the final composition of the contained mixture. In one embodiment of the invention, the feed pipe into the mixing chamber is also rotatable.

Document U.S. Pat. No. 3,897,889A describes a device for dosing, cutting and transporting particulate material, including two or several components, such as e.g. polymer granulate as raw material, whereby the device featuring one first inlet for adding several additives, this one including different dosage valves for the individual additives and a screw conveyer in a housing, onto which the different additives are being placed, whereby the output end of the screw conveyer featuring a downward directed outlet opening and whereby another inlet being arranged in the direction of transport of the particulate material. A concentrated colouring being inserted through this inlet as additional additive onto the screw conveyor, whereby the additional additive being placed onto the screw conveyor via a vibrating slide by means of gravity. The device is space-saving and can be easily and directly mounted onto the extruder.

The prior art mixers, featuring several mixing zones, however having the difficulty that despite all precautionary measures, it comes to a mixing between the mixing zones of the polymer granulate with the additive, added in the following mixing zone. Consequently, especially because of not ideal solid-state behaviour, one additive which had been placed via one inlet for a mixing zones moves contrary to the transport-direction via the screw conveyor into the previous mixing zone. This is undesired, because the benefits of a mixer, featuring several mixing zones for the purpose of adding different additives without being back mixed, would be diminished or even destroyed.

The additive soot e.g. has not only solid state properties, but is also of oily consistence. Consequently, soot moves counter to the transport direction upward into the precedent mixing zone, after some time of adding it into the screw conveyor. In the precedent mixing zone, the polymer granulates, in which soot shall not be contained, is already blackened by low traces of soot in an undesired way. Because a mixer with several mixing zones is being used and this one not being desired to be used for the exclusive use of soot, and also not for the processing of blackened polymer granulate, the back-mixing of the uncoloured polymer granulate through soot via the screw conveyor is undesired.

That is why a mixer need to be provided, allowing the addition of several additives into several mixing zones and preventing the back-mixing of an additive into the precedent mixing zone via the screw conveyor counter to the transport direction, also over a longer period of the additive addition. In this way it would be possible to acquire better product quality also over a longer period of additive addition. In this way, it can be profited from the possibilities of a mixer featuring several mixing zones.

SUMMARY OF THE INVENTION

This task is being accomplished by the invention of a mixer, featuring several mixing zones, in which the mixing zones are arranged between at least one inlet and at least one outlet in the mixer housing and whereby in at least one mixing zone on the screw conveyer non-permanent conveying pattern shapes being helical arranged, the conveying pattern shapes achieving a transport and mixing of the polymer granulate, a continuous screw conveyer existing between at least two mixing zones over a limited distance on the mixing shaft, achieving a transport and avoiding back-mixing of the added additive into the following mixing zone.

This mixer has the advantage of a mixer with several mixing zones, through which several different additives can be added, without that mixing of the single additives in the polymer granulate occurs, whereby the undesired back-mixing of the additives via the mixing shaft into the precedent mixing zone can be avoided. In this way, overall, a better economic efficiency of the manufacturing process of thermoplastic masses with additives is achieved. Because of the discontinuous conveying elements, a better mixing in comparison to the continuous conveying elements is achieved.

The described mixer is especially suitable for the addition to polymer granulate in the mixer, but it can principally be used for mixing any solids with any different additives.

A device for successively inserting additives in a polymer granulate is particularly claimed, comprising
  a mixer including a housing and at least one mixer shaft,
  at least one inlet opening for a polymer granulate,
  at least one inlet opening for a first additive, situated in the direction of transport below the inlet opening for the polymer granulate,
  at least one outlet opening for the polymer granulate mixed with the first additive, situated in the direction of transport below the inlet opening for the polymer granulate and arranged from the first additive, consequently forming a mixing zone,
  at least a second inlet opening for a second additive, situated in the direction of transport below the inlet opening for the polymer granulate, the first inlet opening for the first additive and the outlet opening for the polymer granulate mixed with the first additive,
  at least one second additive for the polymer granulate mixed with the second additive, situated in the direction of transport below the inlet opening, the first inlet opening for the first additive, the outlet opening for the polymer granulate, mixed with the first additive and the second inlet opening for the second additive, consequently forming a second mixing zone,
  drive units, at least including one mixer shaft, characterized in that
  conveying pattern shapes, helically arranged, being mounted within the first mixing zone on the surface of the mixing shaft, effecting a transport and mixing of the polymer granulate, and
  a section being arranged between the outlet opening for the polymer granulate with the first additive and the inlet opening for the second additive between the mixing zones on the surface of the mixing shaft, including a continuous screw conveyor, not being permeable for returning solids from the following mixing zone, and
  non-permeable conveying pattern shapes, helically arranged, being mounted in the following mixing zone again on the surface of the mixing shaft, effecting a transport and mixing of the polymer granulate.

In view of the conveying pattern shapes, one embodiment of the invention concerns linear guiding plates in helically arranged direction. In this way, a particularly gentle mixing with the additives is achieved. Again in view of the conveying pattern shapes, another embodiment of the invention concerns helically curved scoopers. In this way, particularly clean mixing of the polymer granulate with the additives is achieved.

Preferably, the conveying pattern shapes are centrally arranged on the surface of the mixing shaft. In this way, a thorough mixing of the additives with the polymer granulate can be achieved.

Another embodiment of the invention features one or more mixing zones, connecting to the second mixing zone. In this case, there are several inlet openings and outlet openings, namely, the minimum number of the existing mixing zones. One mixing zone is being formed each respectively between one inlet opening for one additive and one outlet opening for the polymer granulate mixed with the first additive.

In the context of the invention it is possible that further non-continuous, helically arranged conveying pattern shapes are mounted within another mixing zone on the surface of the mixing shaft, effecting a transport and mixing of the polymer granulate, and a section being arranged between at least two further mixing zones, including a permeable screw conveyor, this one not being permeable for returning solids from the following mixing zone. Because of this, it is possible to use the device which is according to the invention for adding several additives without backmixing.

One embodiment of the invention, the mixer includes two or several mixing shafts. They can be against each other in line or in opposite directions. They can also be interlocked. By using two or several mixing shafts, a faster transport of the polymer granulate or a better mixing of the polymer granulate with the additives becomes possible. Two or several transport shafts can be particularly of advantage, when using very stringy polymer granulate or granulate which is difficult to transport. This is because a higher force is exerted onto the polymer granulate.

If two or several mixing shafts are being used in the mixer of the invention on hand, the other mixing shafts within at least one mixing zone can be provided with non-permeable conveying pattern shapes, effecting a transport and mixing of the polymer granulate and between the two mixing zones there is one section including a permeable screw conveyor, which is not-permeable for returning solids from the following mixing zone. In this way it can be taken advantage from two or several mixing shafts from the device, according to the invention.

There can be also several inlet openings and outlet openings for one mixing zone. In this case, the same additive is placed into the mixer via each inlet opening for one mixing zone and the polymer granulate provided with each respective additive is removed from the mixer from each outlet opening. This can be useful, particularly when employing several mixing shafts, in order to achieve a better effect of the respective additive over the entire mixer as well as to achieve a faster removal of the polymer granulate with its respective additive. According to demand, the inlet and outlet openings can also be closable.

In another embodiment of the invention at least one of the outlet openings for the polymer granulate mixed with the additive is closable by means of a gate valve. In this way it can be avoided that material is sucked back or transported into the mixer in case that the polymer granulate or the additive is added unevenly.

The mixer of the invention on hand also features provisions for gas exchange and for cleaning the released gas, the provisions allowing gas exchange of the mixer with the surrounding. These can be particularly filter for fine dust.

In this context, the arrangement of the one or several filters can be random. Within the scope of the invention, it is consequently possible that the mixer is divided into segments and that a segment can be arranged centrally between the inlet opening or inlet openings for one mixing zone and the outlet opening or the outlet openings and the filter for fine dusts being arranged exactly centrally in this segment as well as on the mixer. In this way, the mechanism of the filter for this mixing zone is ideal.

Further on, the aforementioned mixer can include the conventional accompanying aggregates and accompanying devices, such as e.g. engines as drive units, valves, circuits, measuring sensors, funnels, heating systems, transport belts or control devices.

Also the application of the described mixer for mixing polymer granulates with different additives is being claimed.

Particularly claimed is the application of the described mixers including different mixing zones and at least one mixing shaft with non-permeable helically arranged conveying pattern shapes on its surface, effecting a transport and mixture of the polymer granulate, whereby at least between two mixing zones on the surface of the mixing shaft there are non-permeable conveying pattern shapes but a section with one continuous screw conveyor, non-continuous for returning solids from the following mixing zone, whereby this one is being used for a polymer granulate with two additives. By using the mixer, it is possible to avoid undesired backmixing of the different additives into the respective preceding mixing zones, so that the different additives cannot be spoiled.

In one embodiment of the application of the invention, the second additive is soot. The application of the aforementioned mixer is useful when using soot as a second additive; this is because like in the mixers including several mixing zones, spoiling of the fresh polymer granulates with soot before reaching the mixing zone with soot is avoided because the soot is not mixed back into the precedent mixing zones. In this way, uneven blackened polymer granulates with poor quality can be avoided.

The aforementioned mixer can also be applied for mixing one polymer granulate with three or several different additives. Thereby, one of the additives can be soot, which is then placed in the last mixing zone. The execution is principally carried out by means of the same mixer admixing two different additives. In ideal circumstances, the applied mixer features its own mixing zone for each added additive. However, in the scope of the invention it is also possible to add two or several additives into one mixing zone.

The invention is advantageous of providing a mixer including several mixing zones, through which different additives can be mixed into a polymer granulate within different mixing zones and through which undesired backmixing of the additive added into one mixing zone into the precedent mixing zone can be avoided. Thereby, altogether a better product quality and a better economic efficiency of the manufacturing process for thermoplastic masses can be achieved. When applying soot, no transparent polymer granulate mixed with additives is being spoiled with soot, even after long addition periods.

The invention is further depicted by means of seven drawings, whereby the drawings only depict embodiments of the invention. They do not restrict the invention in any way.

BRIEF DESCRIPTION OF THE DRAWINGS

Drawing

Drawing

DETAILED DESCRIPTION

Figure 1:
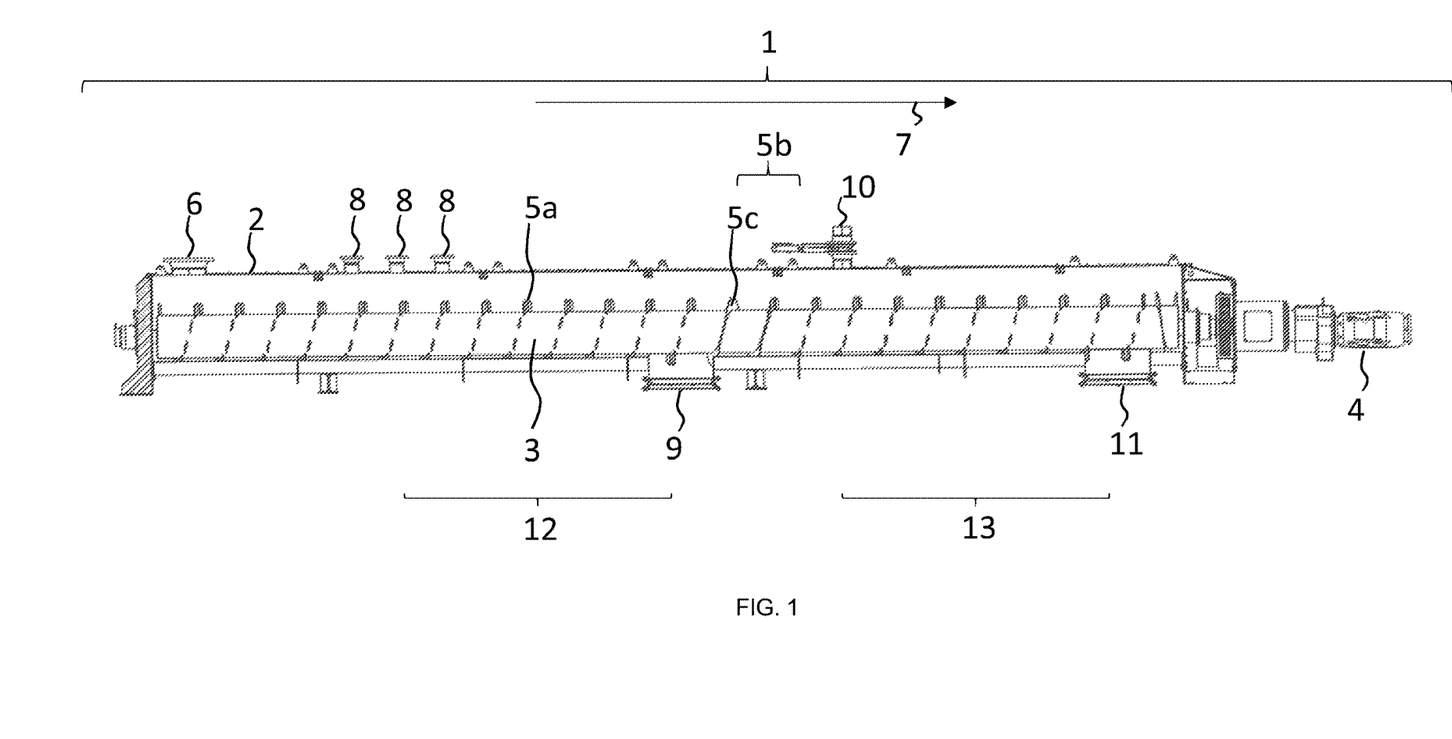
FIG. 1 depicts a mixer including several mixing zones, viewed laterally.

FIG. 1 depicts a mixer (1), featuring a housing (2), further a mixing shaft (3), extending into the inner part of the housing (2) and which is driven by an engine (4) as a drive for the mixing shaft (3). The mixing shaft (3) including helically arranged non-continuous conveying pattern shapes (5a). The housing (2) includes one inlet opening (6) for the polymer granulate, further three inlet openings (8), downwards arranged in transport direction for a first additive, a first outlet opening for polymer granulate (9), mixed with the first additive, a second inlet opening (10) for a second additive and a second outlet opening (11) for polymer granulate, being mixed with the second additive. This additive, removed from the second outlet opening (11) additionally contains the first additive. The first mixing zone (12) is defined by the inlet openings (8) for the first additive and the following outlet opening in transport direction for polymer granulate, mixed with the first additive. The second mixing zone (13) is defined by the inlet opening (10) for the second additive and the following outlet opening (11) in transport direction for polymer granulate, mixed with the second additive. A section including a continuous screw conveyor (5c) is situated between the first outlet opening for polymer granulate (9) mixed with the first additive and the second inlet opening (10) for a second additive. This one is not permeable for a returning second additive from the second inlet opening. Therefore, the second additive cannot be backmixed from the second mixing zone (13) into the first mixing zone.

Figure 2:
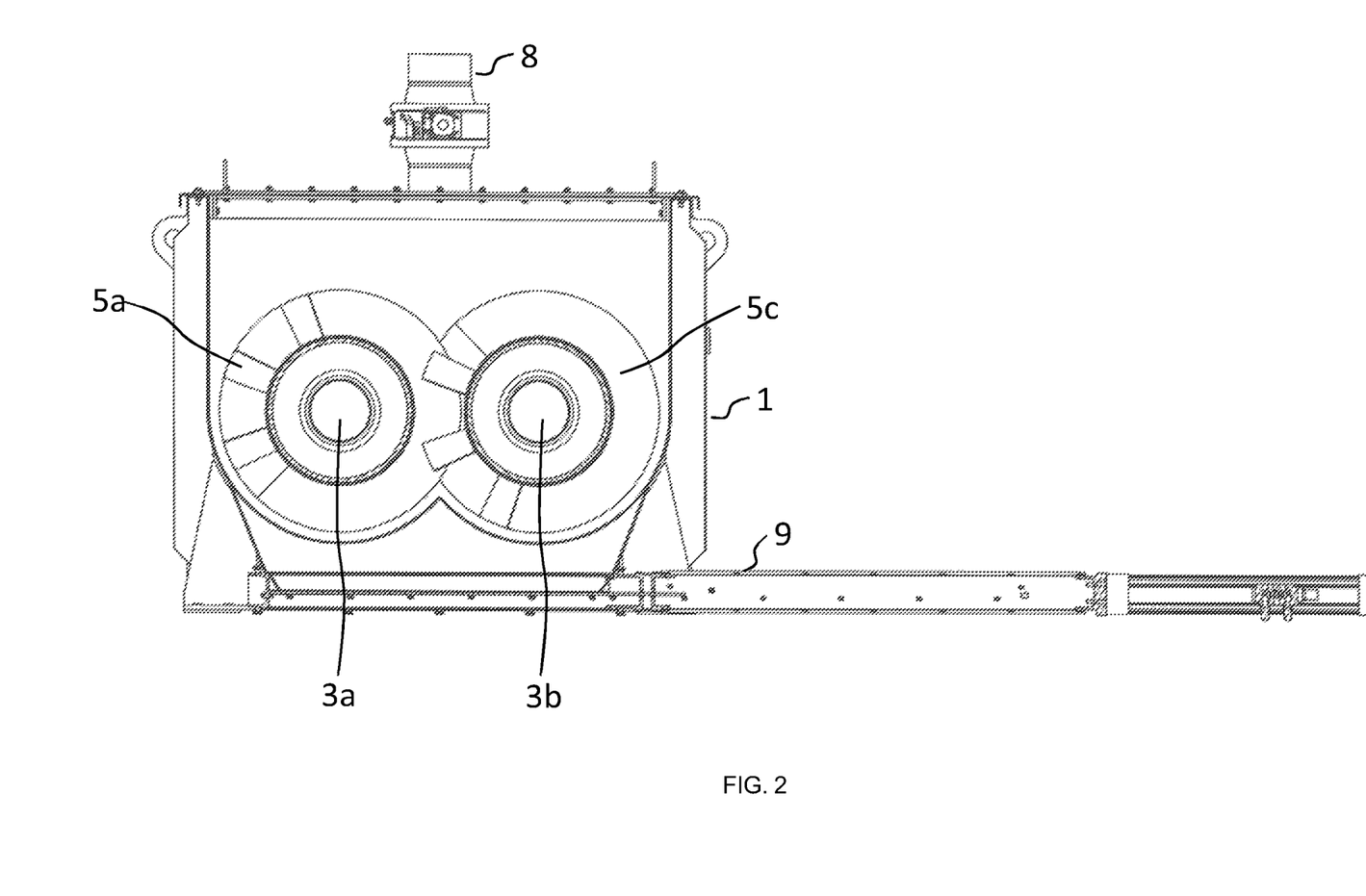
FIG. 2 depicts a mixer including several mixing zones in frontal view in cross section.

FIG. 2 depicts a mixer (2) including several mixing zones (12, 13) viewed in frontal view in cross section. Depicted are two mixing shafts (3a, 3b), one inlet opening (8) for one additive and one outlet opening (9) for polymer granulate including the additive.
The first mixing shaft (3a) features non-continuous conveying pattern shapes; transporting and mixing the polymer granulate with the respective additive. The second mixing shaft (3b) features the section including the continuous screw conveyor (5c).

Figure 3:
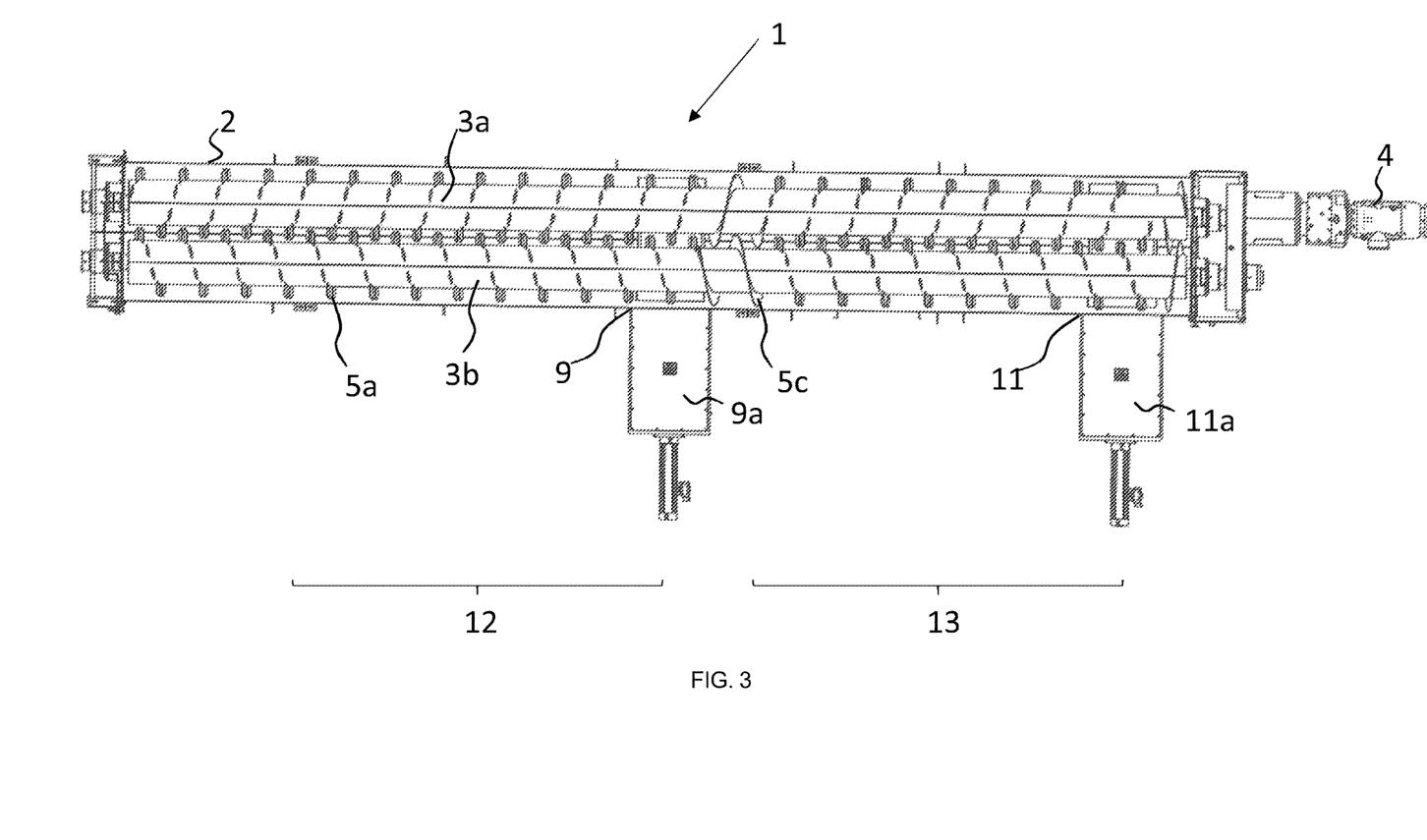
FIG. 3 depicts an opened mixer including several mixing zones, viewed from above.

FIG. 3 depicts an open mixer (1), viewed from above, comprising several mixing zones (12, 13). Depicted are two mixing shafts (3a,3b). Non-continuous conveying pattern shapes are mounted on the mixer shafts (3) within the first mixing zone (12) and the second mixing zone (13). Whereas a section including a continuous screw conveyor (5c) is mounted between the first mixing zone (12) and the second mixing zone (13). Thereby, the additive which is placed into the second mixing zone (13) cannot be back mixed into the first mixing zone. The mixer shafts (3a,3b) ran counter because of the helically direction of rotation of the following mounted conveying pattern shapes (5a) and the screw conveyor (5c). Depicted is also the engine (4) for driving the mixer shafts (3a,3b) as well as two outlet openings (9,11) for polymer granulate with the additive, which are each respectively situated behind a mixing zone. The outlet openings (9,11) are mounted here underneath the housing (2) of the mixer (1), being lockable with gate valves (9a,11a).

Figure 4:
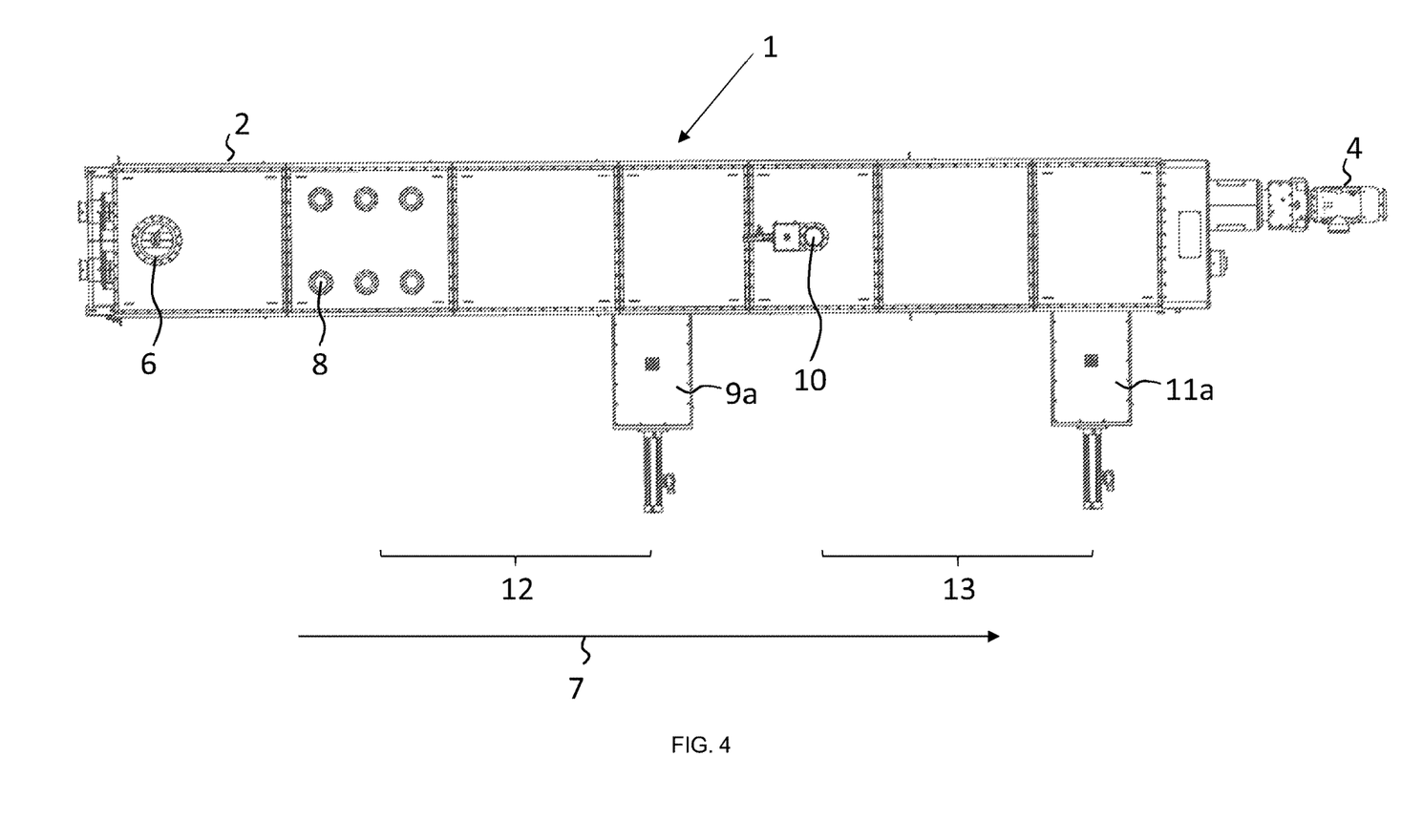
FIG. 4 depicts a closed mixer including several mixing zones.

FIG. 4 depicts a closed mixer (1), viewed from above, including several mixing zones (12,13). Depicted are the housing (2) and the engine (4) for driving the mixing shafts (3). Furthermore, one can see the inlet opening (6) for the unmixed polymer granulate, altogether six inlet openings (8) for the first additive and the gate valve (9a) for one first outlet opening (9) for polymer granulate, mixed with the first additive. In the following, in transport direction (7) one can see one inlet opening (10) for the second additive and the gate valve (11a) for the polymer granulate, mixed with the second additive.

Figure 5:
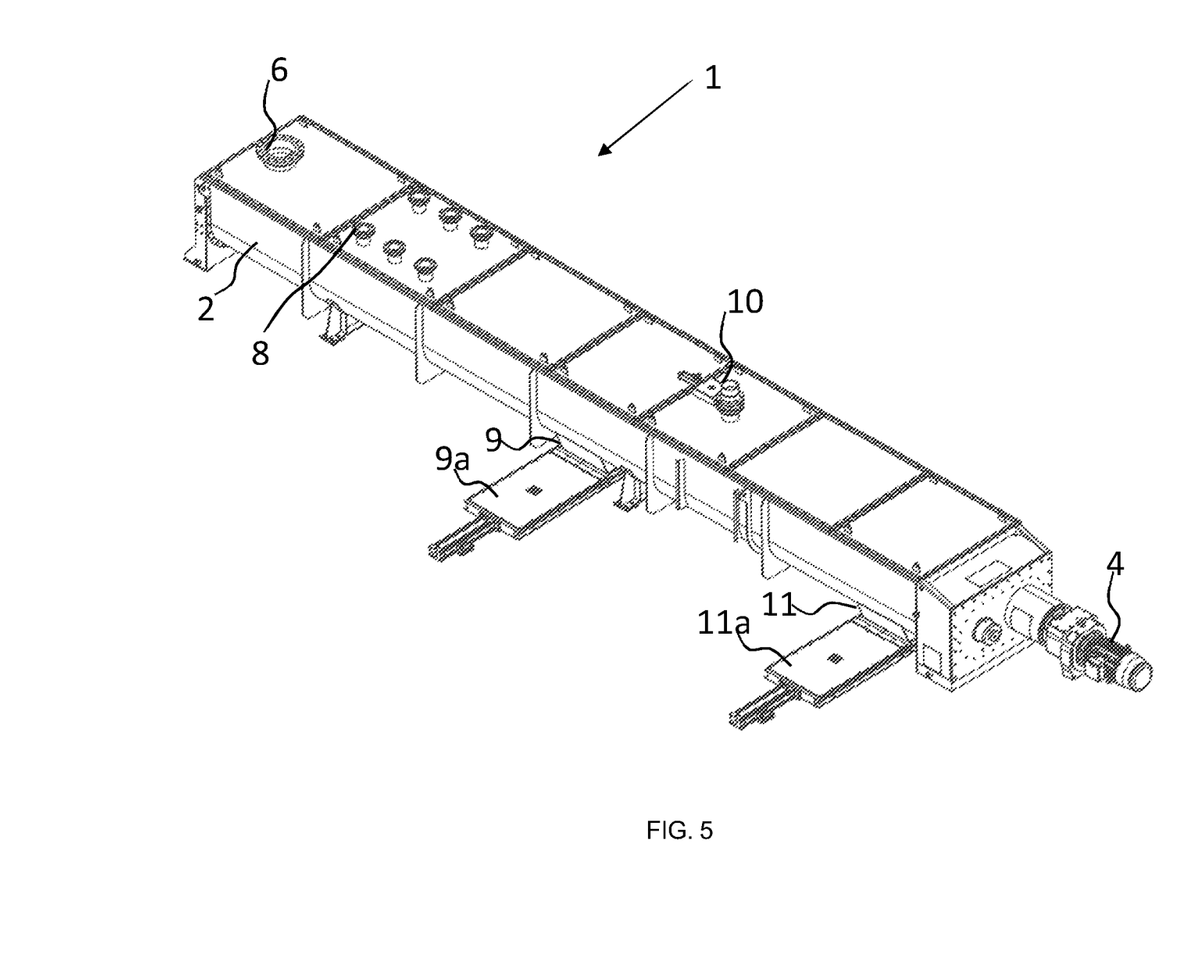
FIG. 5 depicts a closed mixer including several mixing zones, from the side and an angle from above.

FIG. 5 depicts a closed mixer (1) from the side and angle from above including one inlet opening (6) for polymer granulate, further six inlet openings (8) in transport direction and successfully arranged for the first additive, a first outlet opening (9) for polymer granulate, mixed with the first additive, with a gate valve (9a), another inlet opening (10) for the second additive and a second outlet opening (11) including one gate valve (11a) for polymer granulate, mixed with the second additive.

Figure 6:
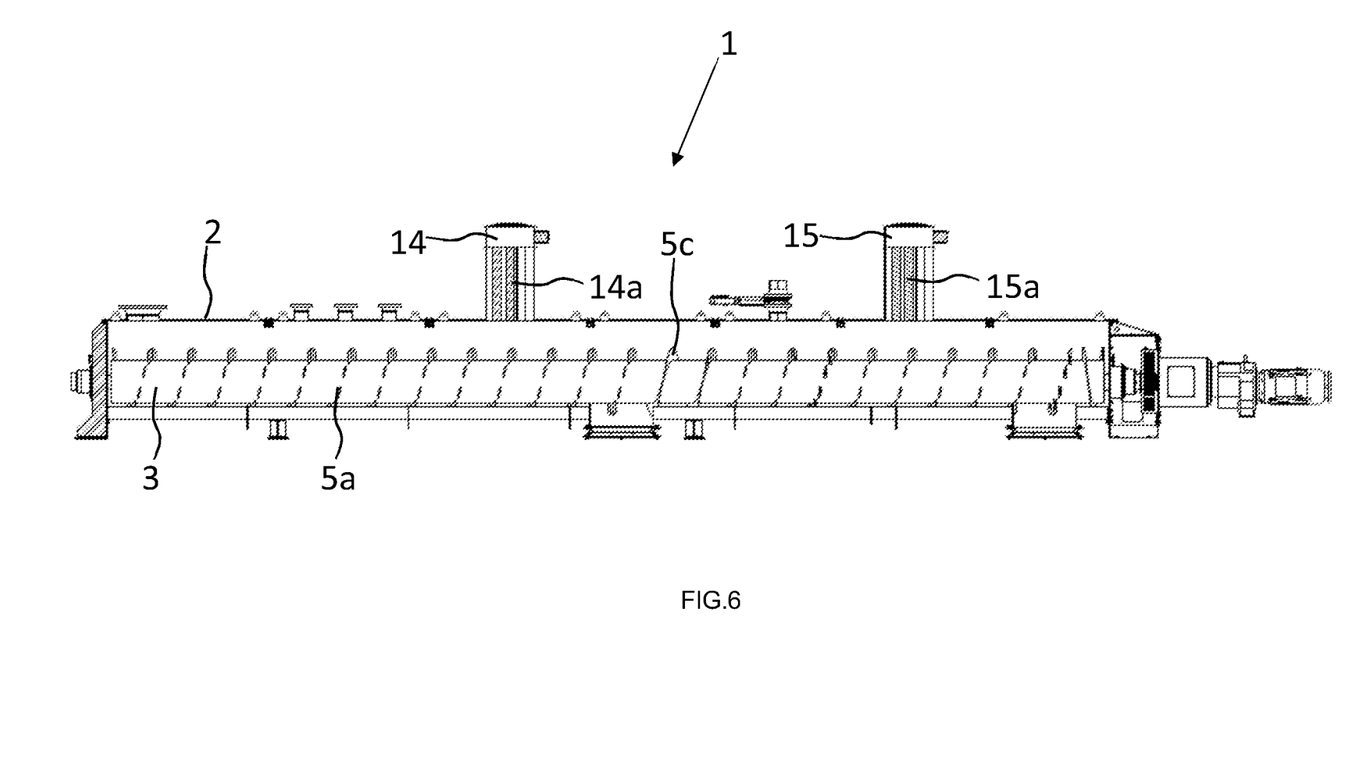
FIG. 6 depicts a mixer including several mixing zones, viewed laterally including two filters.

FIG. 6 depicts a mixer (1) including two filters (14,15) on the housing (2) for the gas exchange during the transport and the mixing of the polymer granulate. Thereby, undesired build-up of pressure in the mixer (1) during the transport and the mixing of the polymer granulate can be avoided. Described are only the housing (2), the mixing shaft (3) the non-continuous conveying pattern shapes (5a) and the section including the continuous screw conveyor (5c). The filters (14,15) are equipped with filter inserts (14a,15a).

Figure 7:
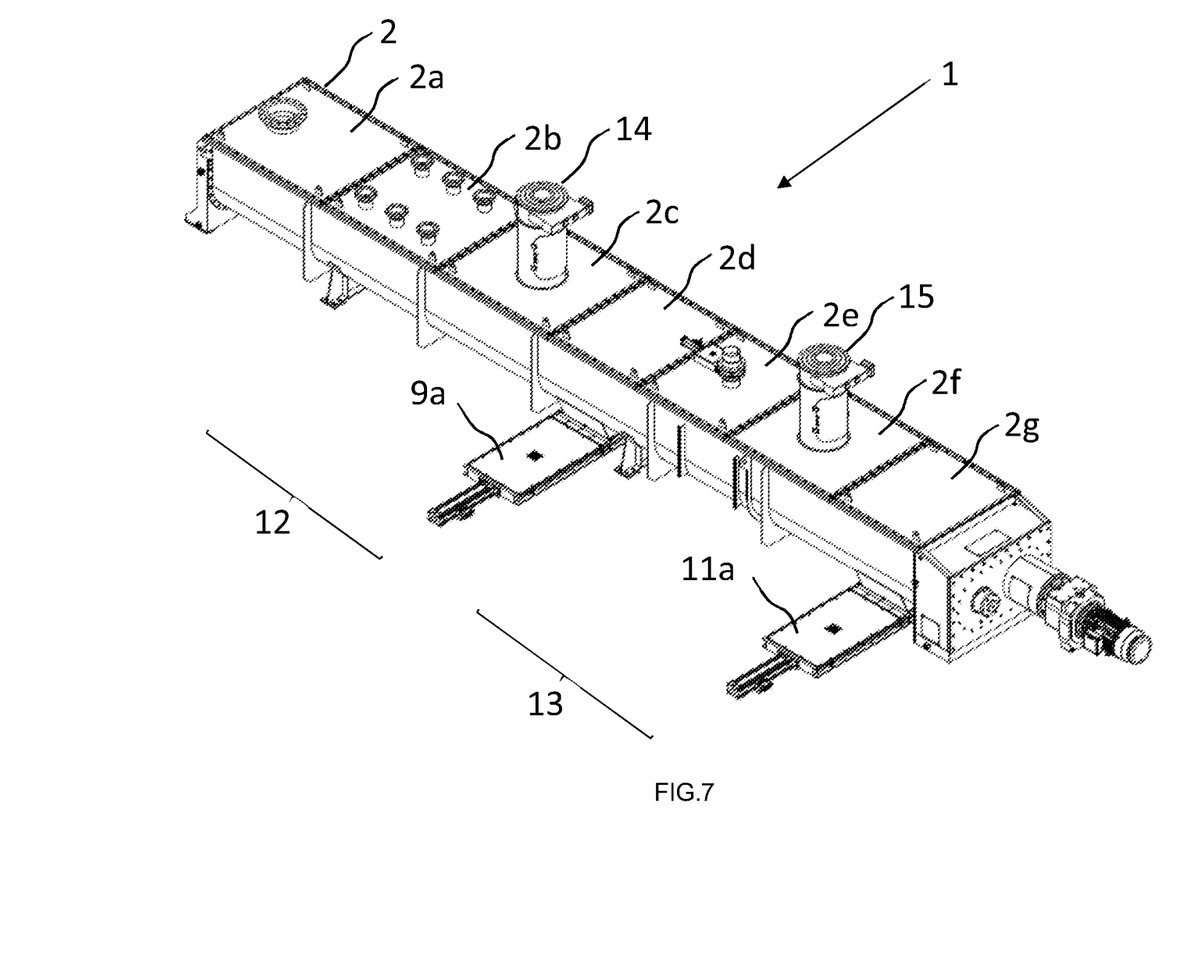
FIG. 7 depicts the closed mixer including several mixing zones including two filters from the side and an angle from above.

FIG. 7 depicts a mixer (1) including two filters (14,15) from the side and the angle from above. The mixer (1) is viewed closed, divided into segments (2a-2g) by the housing (2). The first filter (14) is mounted centrally within the first mixing zone (12) on a centered segment (2c), thereby enabling gas exchange in the first mixing zone (12). The second filter (15) is mounted centrally within the second mixing zone (13) on a centered segment (2f), thereby enabling gas exchange in the second mixing zone (13). Described are also the gate valves (9a,11a) for the outlet openings (9,11).

| Reference signs | |
|---|---|
| 1 | mixer |
| 2 | housing |
| 3 | mixing shaft |
| 3a, 3b | two different mixing shafts |
| 4 | engine |
| 5a | non-continuous conveying pattern shapes, helically arranged |
| 5b | section including continuous screw conveyor |
| 5c | continuous screw conveyor, helically arranged |
| 6 | first inlet opening for polymer granulate |
| 7 | transport direction |
| 8 | second inlet for first additive |
| 9 | first outlet opening for polymer granulate, including first additive |
| 9a | gate valve for the first outlet opening |
| 10 | third outlet opening for second additive |
| 11 | second outlet opening for polymer granulate, including second additive |
| 11a | gate valve for the second outlet opening |
| 12 | first mixing zone |
| 13 | second mixing zone |
| 14 | first filter |
| 14a | filter insert for first filter |
| 15 | second filter |
| 15a | filter insert for second filter |

The invention claimed is:
1. A device for sequentially introducing additives in a polymer granulate, including
a mixer with housing, and at least one mixer shaft;
at least one first inlet opening for a polymer granulate,
at least one second inlet opening for one first additive, situated in transport direction below the first inlet opening for the polymer granulate,
at least one first outlet opening for the polymer granulate mixed with the first additive, situated in transport direction below the first inlet opening for the polymer granulate and from the second inlet opening for the first additive, consequently forming a first mixing zone,
at least one third inlet opening for a second additive, situated in transport direction below the first inlet opening for the polymer granulate, the second inlet opening for the first additive and the first outlet opening for the polymer granulate mixed with the first additive,
at least one second outlet opening for the polymer granulate, mixed with the second additive, situated in transport direction below the first inlet opening for the polymer granulate, the second inlet opening for the first additive, the first outlet opening for the polymer granulate mixed with the first additive and the third inlet opening for the second additive, thereby forming a second mixing zone,
driving units for driving the at least one mixing shaft, wherein non-continuous conveying pattern shapes are helically mounted within the first mixing zone on the surface of the mixing shaft, effecting a transport and mixing of the polymer granulate, a section being provided, including a continuous screw conveyor (5c) between the first outlet opening for the polymer granulate mixed with the first additive and the third inlet opening for the second additive between the mixing zones on the surface of the mixing shaft, the section not being permeable for returning solids from the following mixing zone, and helically arranged non-continuous conveying pattern shapes mounted in the following mixing zone then again on the surface of the mixing shaft, effecting a transport and mixing of the polymer granulate.

2. The device according to claim 1, wherein the non-continuous conveying pattern shapes concern helically arranged, linear guiding plates.

3. The device according to claim 1, wherein the non-continuous conveying pattern shapes concern helically arranged, curved scoops.

4. The device according to claim 1, wherein the non-continuous conveying pattern shapes are centrally arranged on the surface of the mixing shaft.

5. The device according to claim 1, wherein the second mixing zone is followed by one or several mixing zone in the same way.

6. The device according to claim 5, wherein helically arranged, non-continuous conveying pattern shapes are mounted within at least one mixing zone on the surface of the mixing shaft, effecting a transport and mixing of the polymer granulate and a section, including a continuous screw conveyor being provided between at least two further mixing zones, permeable for returning solids from the following mixing zone.

7. The device according to claim 1, wherein the mixer comprises two or several mixing shafts.

8. The device according to claim 7, wherein also the second or further mixing shafts are equipped with non-continuous conveying pattern shapes within at least one mixing zone, effecting a transport and mixing of the polymer granulate and a section being provided between at least two mixing zones, including a continuous screw conveyor, not permeable for returning solids from the following mixing zone.

9. The device according to claim 1, wherein at least one of the outlet openings is closable by a gate valve.

10. The device according to claim 1, wherein a filter is mounted for fine dusts between at least one mixing zone, enabling gas exchange of the mixer with its surrounding.

11. The device according to claim 10, wherein the mixer is divided into segments and a segment being provided centrally between the second inlet opening or the inlets for one mixing zone and the first outlet opening or the outlet openings and the filter for fine dusts is mounted exactly centrally within this segment and on the mixer.

12. A method of using a device for sequentially introducing additives in a polymer granulate, comprising:
introducing the additives into the device comprising:
a mixer with housing, and at least one mixer shaft;
at least one first inlet opening for a polymer granulate,
at least one second inlet opening for one first additive, situated in transport direction below the first inlet opening for the polymer granulate,
at least one first outlet opening for the polymer granulate mixed with the first additive, situated in transport direction below the first inlet opening for the polymer granulate and from the second inlet opening for the first additive, consequently forming a first mixing zone,
at least one third inlet opening for a second additive, situated in transport direction below the first inlet opening for the polymer granulate, the second inlet opening for the first additive and the first outlet opening for the polymer granulate mixed with the first additive,
at least one second outlet opening for the polymer granulate, mixed with the second additive, situated in transport direction below the first inlet opening for the polymer granulate, the second inlet opening for the first additive, the first outlet opening for the polymer granulate mixed with the first additive and the third inlet opening for the second additive, thereby forming a second mixing zone,
driving units for driving the at least one mixing shaft,
wherein
non-continuous conveying pattern shapes are helically mounted within the first mixing zone on the surface of the mixing shaft, effecting a transport and mixing of the polymer granulate,
a section being provided, including a continuous screw conveyor (5c) between the first outlet opening for the polymer granulate mixed with the first additive and the third inlet opening for the second additive between the mixing zones on the surface of the mixing shaft, the section not being permeable for returning solids from the following mixing zone, and
helically arranged non-continuous conveying pattern shapes mounted in the following mixing zone then again on the surface of the mixing shaft, effecting a transport and mixing of the polymer granulate, wherein the device is used for mixing a polymer granulate with two different additives.

13. The method according to claim 12, wherein the second additive is soot.

14. The method according to claim 12, wherein the device used for mixing a polymer granulate with three or several additives.

15. The method according to claim 12, wherein one of the additives is soot.

* * * * *